(12) United States Patent
Lee

(10) Patent No.: US 8,857,750 B2
(45) Date of Patent: Oct. 14, 2014

(54) RETRACTOR/PRETENSIONER APPARATUS OF SEATBELT FOR VEHICLE

(75) Inventor: Su Cheol Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 200 days.

(21) Appl. No.: 13/492,427

(22) Filed: Jun. 8, 2012

(65) Prior Publication Data

US 2013/0126654 A1 May 23, 2013

(30) Foreign Application Priority Data

Nov. 18, 2011 (KR) ........................ 10-2011-0120639

(51) Int. Cl.
*B60R 22/34* (2006.01)

(52) U.S. Cl.
USPC ........................................... 242/374

(58) Field of Classification Search
USPC ........................................... 242/374
See application file for complete search history.

(56) References Cited

U.S. PATENT DOCUMENTS

| 6,732,968 B2 * | 5/2004 | Yoon | 242/382.6 |
| 7,401,815 B2 * | 7/2008 | Clute | 280/803 |
| 8,459,583 B2 * | 6/2013 | Ogawa | 242/374 |

FOREIGN PATENT DOCUMENTS

| JP | 2000198413 A | 7/2000 |
| KR | 1020070054275 A | 5/2007 |

\* cited by examiner

*Primary Examiner* — Sang Kim
(74) *Attorney, Agent, or Firm* — Morgan, Lewis & Bockius LLP

(57) ABSTRACT

A retractor/pretensioner apparatus of a seatbelt for a vehicle may include a housing, a spool to which ends of a shoulder webbing and a wrap webbing may be simultaneously connected and which may be rotatably installed in the housing via a rotary shaft, a pinion coupled to one end of the rotary shaft, a first rack and a second rack slidably installed to the housing and engaged with the pinion respectively, a first gas generator fluid-connected to the first rack to provide gas to the first rack, and a second gas generator fluid-connected to the second rack to provide gas to the second rack.

5 Claims, 6 Drawing Sheets

US 8,857,750 B2

RETRACTOR/PRETENSIONER APPARATUS OF SEATBELT FOR VEHICLE

CROSS-REFERENCE TO RELATED APPLICATION

The present application claims priority to Korean Patent Application No. 10-2011-0120639 filed on Nov. 18, 2011, the entire contents of which is incorporated herein for all purposes by this reference.

BACKGROUND OF THE INVENTION

1. Field of the Invention

The present disclosure relates to a retractor/pretensioner apparatus of a seatbelt for a vehicle. More particularly, it relates to a retractor/pretensioner apparatus of a seatbelt for a vehicle which enhances a rotating speed of a pinion and prevents a defect generated due to deviation of the pinion.

2. Description of Related Art

As shown in FIG. 1, a seat of a vehicle is equipped with a seatbelt 1 for constraining and protecting an upper body of a passenger during an accident. The seatbelt 1 is classified into a shoulder webbing 1a for constraining the shoulder and chest of a seated person and a wrap webbing 1b for constraining the pelvis and lower body of the seated person, with respect to a buckle tongue 2.

One end of the shoulder webbing 1a is connected to a retractor/pretensioner 3, and one end of the wrap webbing 1b is connected to an anchor/pretensioner 4.

However, in the conventional apparatus, the retractor/pretensioner 3 and the anchor/pretensioner 4 are used to wind the shoulder webbing 1a and the wrap webbing 1b respectively, increasing the number of parts, and the manufacturing costs and the weight of the apparatus.

In order to compensate the disadvantages, as illustrated in FIG. 2, an apparatus for simultaneously winding a shoulder webbing 1a and a wrap webbing 1b of a seatbelt 1 with one retractor/pretensioner 10 was developed.

As illustrated in FIGS. 2 and 3, in the retractor/pretensioner 10, one spool 12 having a cylindrical roller-like shape is rotatably installed within a housing 11 by the medium of a rotary shaft 13. A pinion 14 is integrally connected to the rotary shaft 13. A rack 15 is connected to the pinion. The rack 15 is connected to a gas generator 16. One end of the shoulder webbing 1a and one end of the wrap webbing 1b are simultaneously connected to the spool 12.

Thus, when gas is generated due to an explosion of the gas generator 16 according to a signal from an airbag ECU, the rack 15 moves along a rack guide 17 by a gas pressure and rotates the pinion 14 as illustrated in FIG. 4. As the spool 12 is rotated by the rotation of the pinion 14, the shoulder webbing 1a and the lap webbing 1b are simultaneously wound by the rotation of the spool 12, constraining a passenger with the seat belt 1.

However, because the conventional retractor/pretensioner 10 has a structure in which the pinion 14 connected to the spool 14 is rotated by the gas pressure of one gas generator 16 and a moving force of one rack 15, the rotating speeds of the pinion 14 and the spool 12 are not high, so the shoulder webbing 1a and the lap webbing 1b cannot be rapidly wound. Thus, a constraining performance of a passenger by the seat belt 1 decreases due to the disadvantage.

Further, due to a structure of allowing one rack 15 to rotate the pinion 15, when the rack 15 is operated, there is generated a phenomenon in which a load is concentrated at a portion on the pinion 14 which the rack 15 contact. Consequently, there are problems that the pinion 14 is easily separated from the rotation shaft 3 or damaged due to the eccentric load.

The items which have been described as the prior art only help understanding of the background of the present invention, but should not be construed to admit that the prior art corresponds to a technology well known to those skilled in the art to which the present invention pertains.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a retractor/pretensioner apparatus of a seatbelt for a vehicle which enhances the rotating speed of a pinion to rapidly wound a shoulder webbing and a wrap webbing, and further enhances a constraining performance of a passenger by the seatbelt, and providing a retractor/pretensioner apparatus of a seatbelt for a vehicle which prevents an eccentric load from being generated at a portion of the pinion contacting the rack and prevents separation of and damage to the pinion, improving durability.

In accordance with an aspect of the present invention, a retractor/pretensioner apparatus of a seatbelt for a vehicle may include a housing, a spool to which ends of a shoulder webbing and a wrap webbing are simultaneously connected and which is rotatably installed in the housing via a rotary shaft, a pinion coupled to one end of the rotary shaft, a first rack and a second rack slidably installed to the housing and engaged with the pinion respectively, a first gas generator fluid-connected to the first rack to provide gas to the first rack, and a second gas generator fluid-connected to the second rack to provide gas to the second rack.

The retractor/pretensioner apparatus may include a first rack guide fixedly installed in the housing and slidably receiving the first rack therein to guide movement of the first rack when the first rack is actuated by the first gas generator, and a second rack guide fixedly installed in the housing and slidably receiving the second rack therein to guide movement of the second rack when the second rack is actuated by the second gas generator.

The first and second racks are moved in opposite directions with a phase of 180 degrees with respect to the pinion.

The first and second racks may have the same shape and weight.

The first and second gas generators may have the same maximum amount of gas explosives.

The shoulder webbing and wrap webbing are moved in opposite directions with a phase of 180 degrees with respect to the spool.

According to various aspects of the present invention, the retractor/pretensioner apparatus of a seatbelt for a vehicle can enhance the rotating speed of the pinion, further enhancing a constraining performance of a passenger, prevent an eccentric load from being generated in the pinion and prevent separation of and damage to the pinion, enhancing durability.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
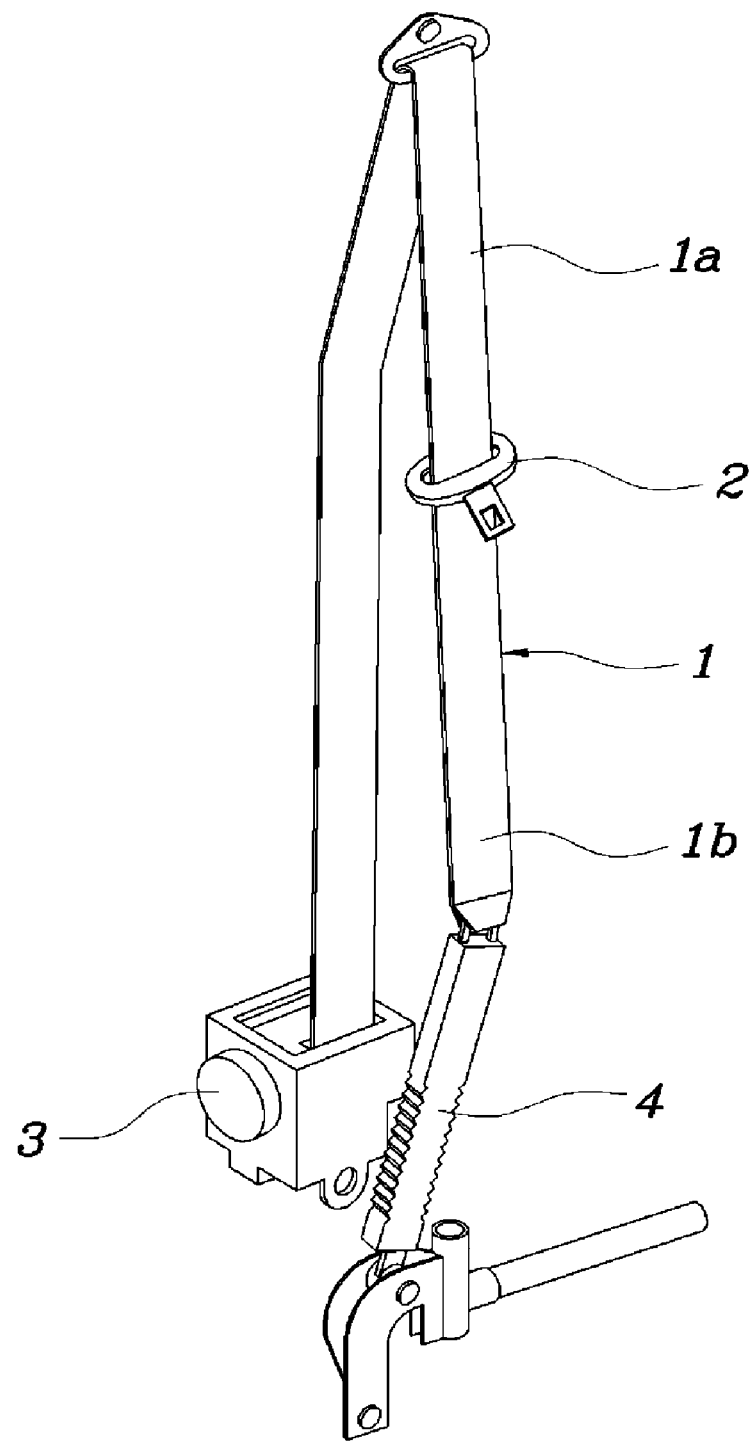
FIG. 1 is a view illustrating a conventional apparatus equipped with a retractor/pretensioner and an anchor/pretensioner.
Figure 2:
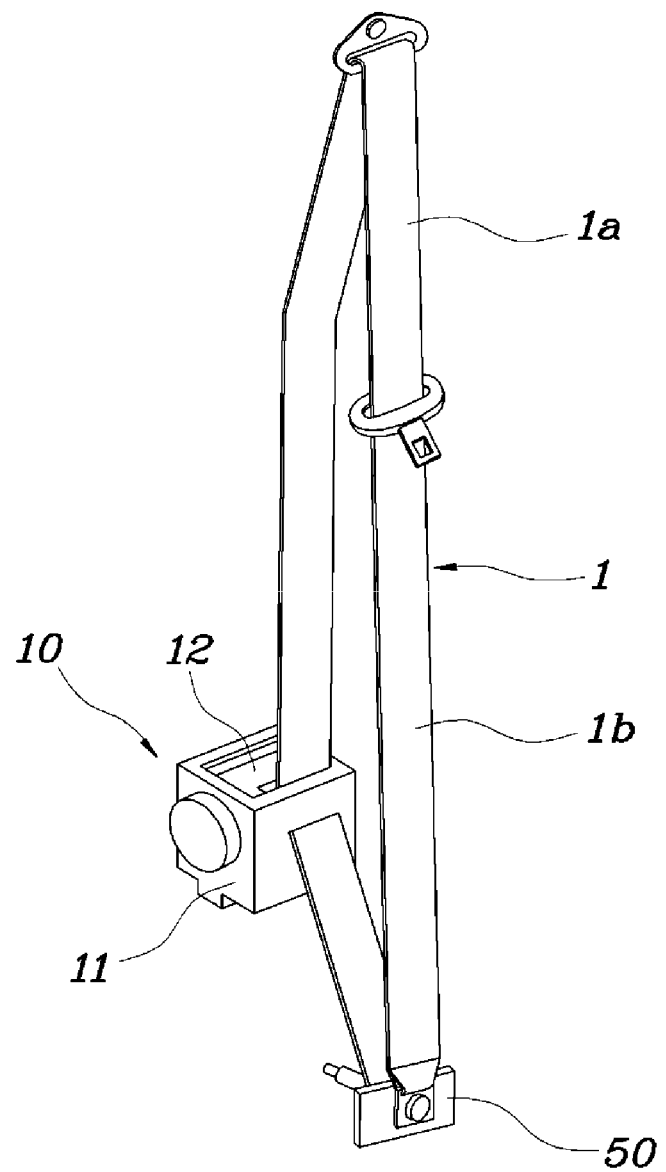
FIGS. 2 to 4 are views illustrating a conventional retractor/pretensioner.
Figure 3:
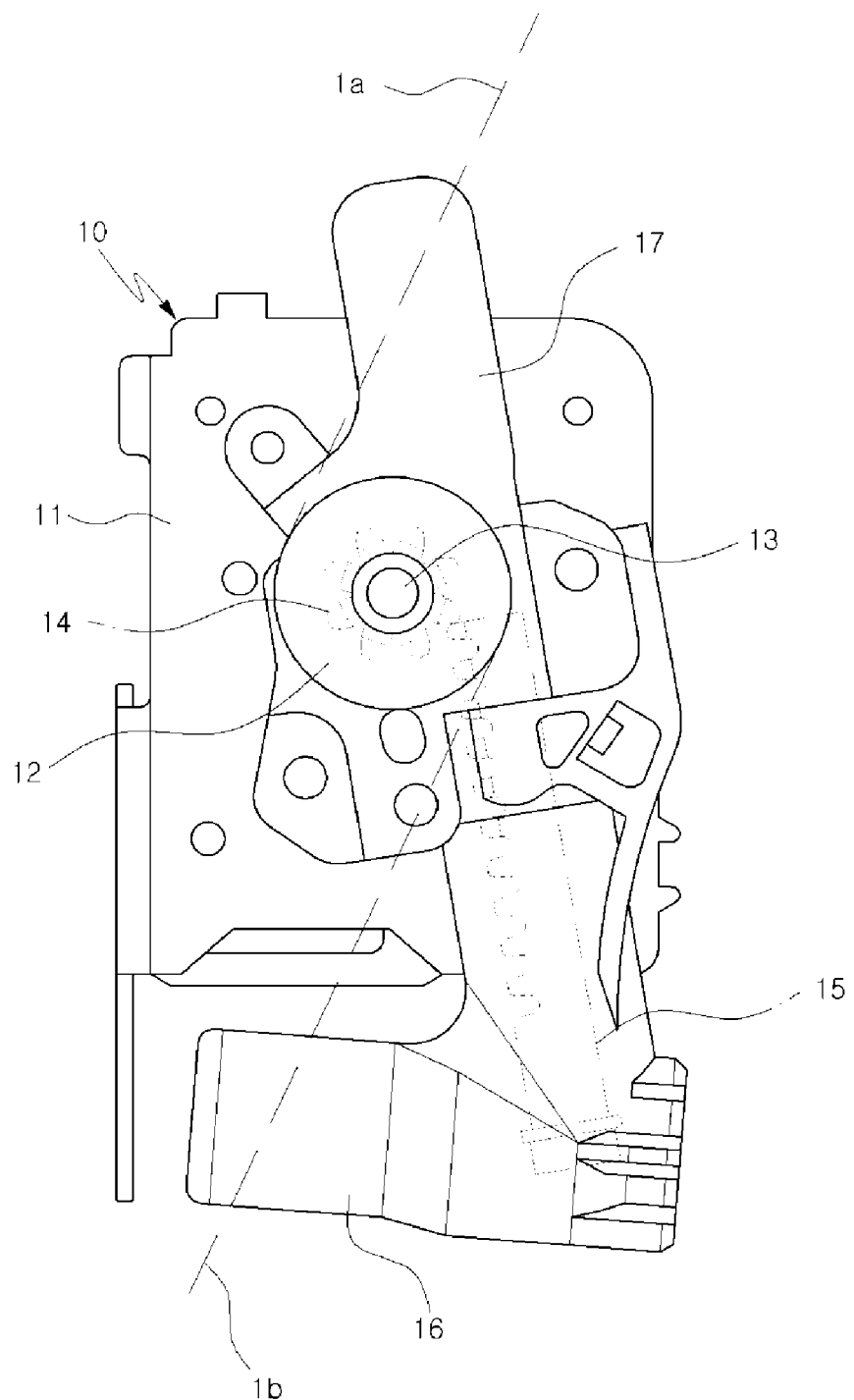
Figure 4:
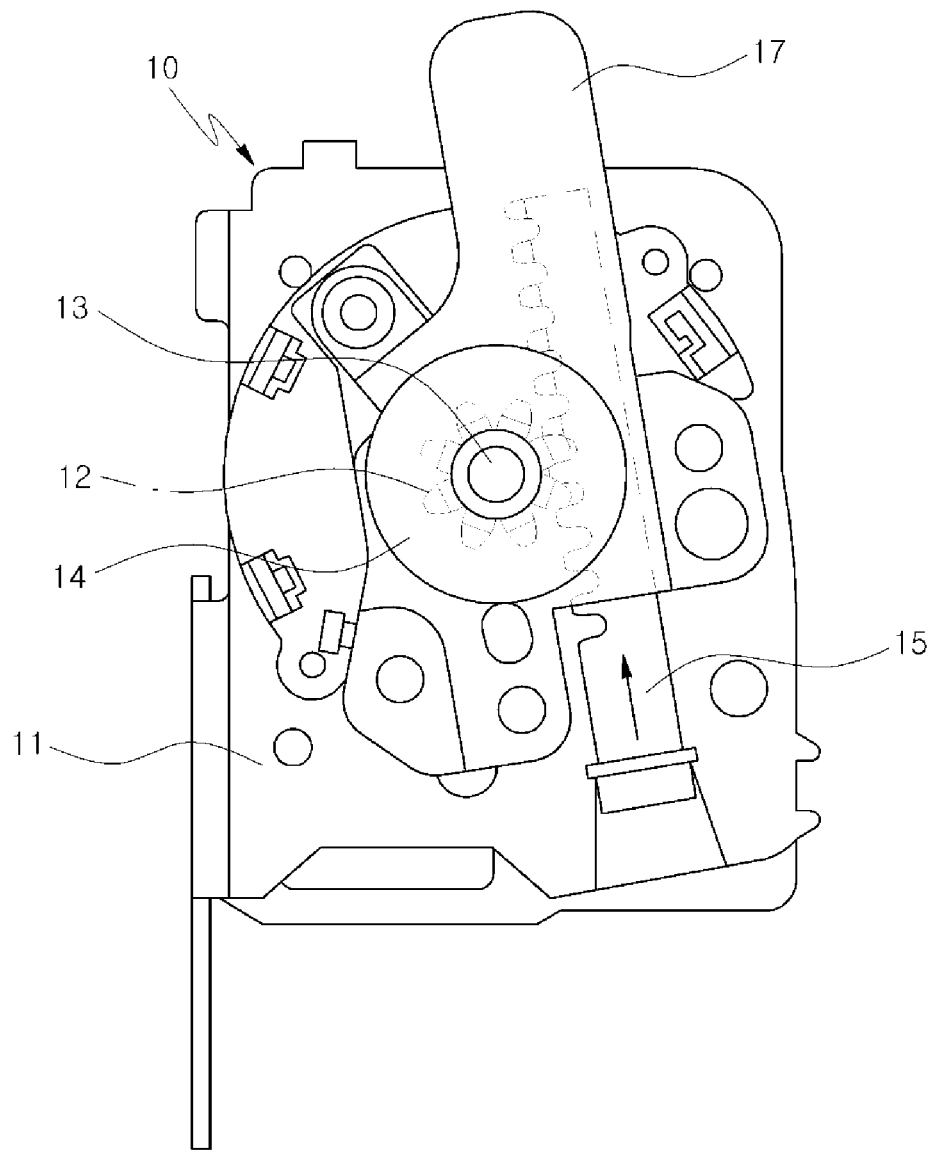

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a retractor/pretensioner apparatus of a seatbelt for a vehicle according to an exemplary embodiment of the present invention will be described with reference to the accompanying drawings.

Figure 5:
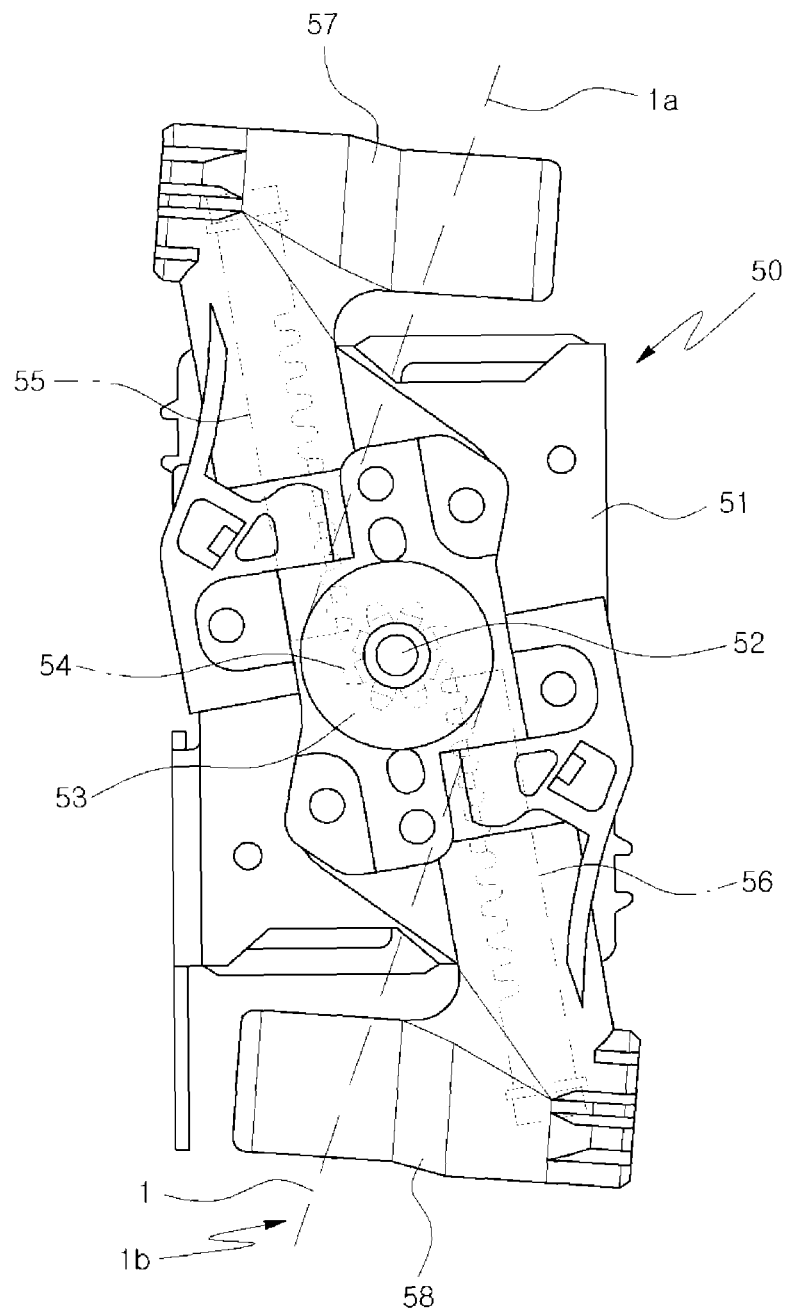
FIGS. 5 and 6 are views illustrating a retractor/pretensioner apparatus according to an exemplary embodiment of the present invention.
Figure 6:
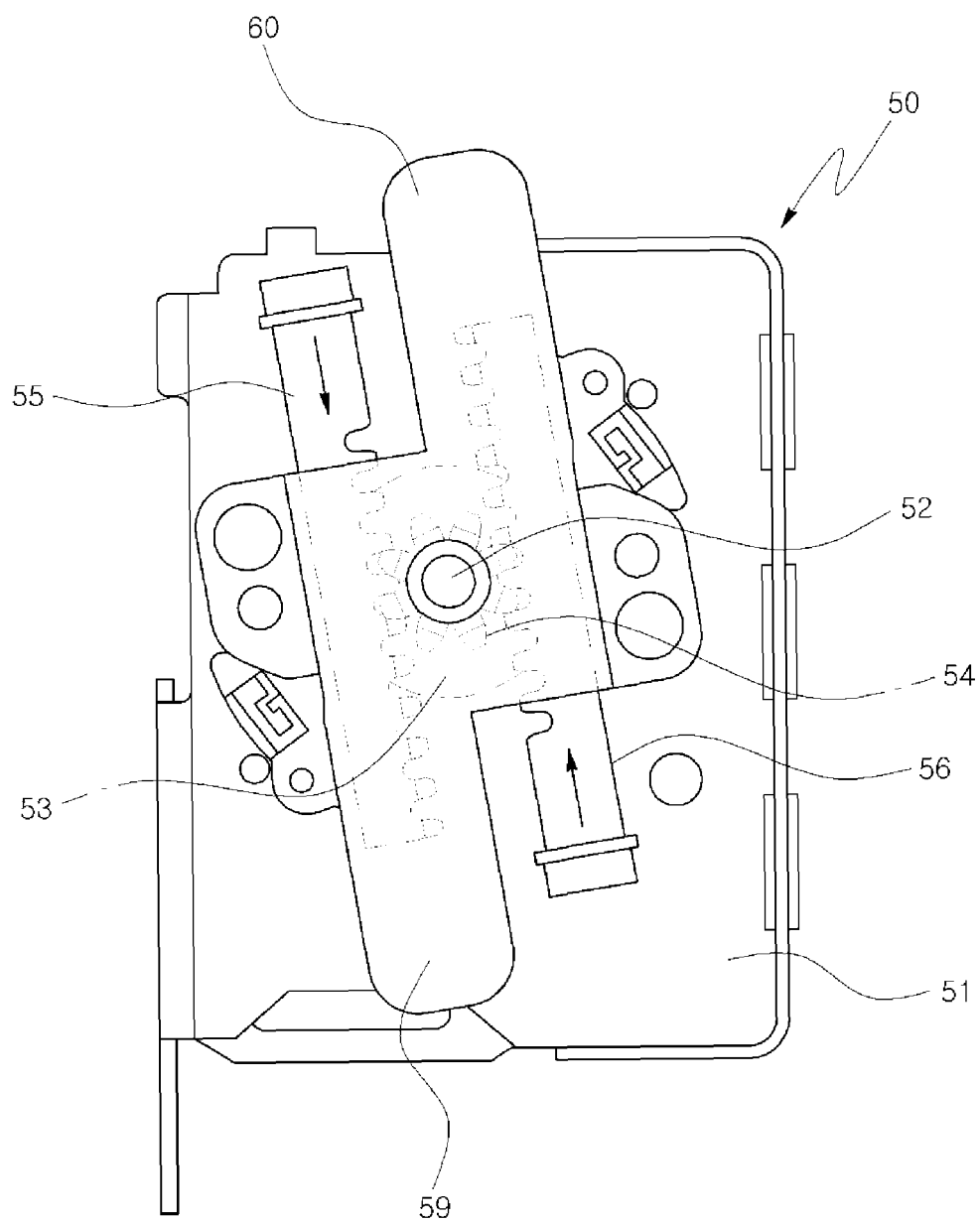

As illustrated in FIGS. 5 and 6, the retractor/pretensioner apparatus 50 of a seatbelt for a vehicle according to an exemplary embodiment of the present invention includes a spool 53 to which ends of a shoulder webbing 1a and a wrap webbing 1b of a seatbelt 1 are simultaneously connected and which is rotatably installed in a housing 51 by the medium of a rotary shaft 52, a pinion 54 integrally connected to one end of the rotary shaft 52, a first rack 55 and a second rack 56 connected to the pinion 54 respectively, a first gas generator 57 connected to the first rack 55 to provide gas to the first rack 55, a second gas generator 58 connected to the second rack 56 to provide gas to the second rack 56, a first rack guide 59 fixedly installed in the housing 51 to guide movement of the first rack 55 when the first gas generator 57 is operated, and a second rack guide 60 fixedly installed in the housing 51 to guide movement of the second rack 56 when the second gas generator 58 is operated.

In an exemplary embodiment of the present invention, the shoulder webbing 1a and the wrap webbing 1b are moved in opposite directions with a phase of 180 degrees with respect to the spool 53.

Here, the first and second gas generators 57 and 58 is configured to be exploded by control signals of an airbag ECU, and the first and second racks 55 and 56 are configured to be moved along the first and second rack guides 59 and 60 by the gas created during the explosions.

The first and second racks 55 and 56 are installed such that they can be moved in opposite directions with a phase of 180 degrees with respect to the pinion 54.

That is, since the shoulder webbing 1a and the wrap webbing 1b of the seat belt 1 are simultaneously connected to one spool 53, the shoulder webbing 1a and the wrap webbing 1b should be simultaneously wound on the spool 53 when the spool 53 is rotated. To achieve this, the first and second racks 55 and 56 are preferably configured to be moved in opposite directions with a phase of 180 degrees with respect to the pinion 54.

The first and second racks 55 and 56 are configured to have the same shape and weight, and the first and second gas generators 57 and 58 has the same maximum amount of gas explosives.

That is, the pinion 54 may be smoothly rotated only if the first and second racks 55 and 56 move at the same speed when the first and second gas generators 57 and 58 explode, preventing a load from being concentrated on two portions of the pinion 54 contacting the first and second racks 55 and 56.

Meanwhile, if the weights of the first and second racks 55 and 56 are different and the maximum amounts of gas explosives of the first and second gas generators 57 and 58 are different, the first and second racks 55 and 56 move at different speeds. Thus, the pinion 54 cannot be smoothly moved. In particular, a load is prevented from being concentrated on one of the two portions of the pinion 54 contacting the first and second racks 55 and 56.

If the pinion 54 is not smoothly rotated, the rotating speed of the spool 53 is not high. Accordingly, as the shoulder webbing 1a and the wrap webbing 1b cannot be wound rapidly, a constraining performance of a passenger by the seatbelt 1 is reduced.

If an eccentric load is generated at one of the two portions of the pinion 54 contacting the first and second racks 55 and 56, the pinion 54 may be easily separated from the rotary shaft 52 or damaged.

Thus, according to an exemplary embodiment of the present invention, it is preferable that the first and second racks 55 and 56 have the same shape and weight and the first and second gas generators 57 and 58 have the same maximum amount of gas explosives in order to enhance a constraining performance of a passenger by the seat belt and prevent the pinion 54 from being separated and damaged.

Here, the maximum amounts of gas explosives of the first and second gas generators 57 and 58 are preferably 1400 mg respectively, but are not limited thereto.

Meanwhile, FIG. 6 illustrates a state where the first and second gas generators 57 and 58 explode according to a control signal of an airbag ECU and the first and second racks 55 and 56 are moved along the first and second rack guides 59 and 60 by the generated gas pressure.

The pinion 54 is rotated when the first and second racks 55 and 56 are moved along the first and second rack guides 59 and 60, and the spool 53 is rotated by the rotation of the pinion

54. Then, as the shoulder webbing 1a and the wrap webbing 1b are simultaneously wound on the spool 53 by the rotation of the spool 53, a passenger is constrained by the seatbelt 1.

Accordingly, in the retractor/pretensioner apparatus of a seatbelt according to an exemplary embodiment of the present invention, the rotating speed of the pinion 54 is improved by the first and second racks 55 and 56 and the first and second gas generators 57 and 58, the shoulder webbing 1a and the wrap webbing 1b can be rapidly wound, making it possible to further improve a constraining performance of a passenger by the seatbelt 1.

Further, since the apparatus according to an exemplary embodiment of the present invention has a structure where the first and second racks 55 and 56 rotate the pinion 54 at the same speed when the first and second gas generators 57 and 58 are operated, it prevents an eccentric load from being generated in the pinion 54. Accordingly, the pinion 54 is prevented from being separated and damaged while enhancing durability.

While the present invention has been illustrated and described with reference to the specific embodiment, it is understood by those skilled in the art that the present invention can be variously modified and changed without departing from the technical sprit of the present invention provided in the following claims.

For convenience in explanation and accurate definition in the appended claims, the terms "upper", "lower", "inner" and "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A retractor/pretensioner apparatus of a seatbelt for a vehicle, comprising:
    a housing;
    a spool to which ends of a shoulder webbing and a wrap webbing are simultaneously connected and which is rotatably installed in the housing via a rotary shaft;
    a pinion coupled to one end of the rotary shaft;
    a first rack and a second rack slidably installed to the housing and engaged with the pinion respectively;
    a first gas generator fluid-connected to the first rack to provide gas to the first rack; and
    a second gas generator fluid-connected to the second rack to provide gas to the second rack;
    wherein the first and second gas generators have the same maximum amount of gas explosives and the first rack and the second rack moves at the same speed by operation of both of the first and second gas generators.

2. The retractor/pretensioner apparatus of claim 1, further comprising:
    a first rack guide fixedly installed in the housing and slidably receiving the first rack therein to guide movement of the first rack when the first rack is actuated by the first gas generator; and
    a second rack guide fixedly installed in the housing and slidably receiving the second rack therein to guide movement of the second rack when the second rack is actuated by the second gas generator.

3. The retractor/pretensioner apparatus of claim 1, wherein the first and second racks are moved in opposite directions with a phase of 180 degrees with respect to the pinion.

4. The retractor/pretensioner apparatus of claim 1, wherein the first and second racks have the same shape and weight.

5. The retractor/pretensioner apparatus of claim 1, wherein the shoulder webbing and wrap webbing are moved in opposite directions with a phase of 180 degrees with respect to the spool.

* * * * *